United States Patent [19]

Hayes et al.

[11] Patent Number: 4,525,253
[45] Date of Patent: Jun. 25, 1985

[54] METHOD AND APPARATUS FOR PURIFICATION OF WATER

[75] Inventors: Daniel F. Hayes; Robert G. Sias, both of Lake Worth; Lloyd Chesney, West Palm Beach; John W. Waldron, Highland Beach, all of Fla.

[73] Assignee: MED Products, Inc., Archer, Fla.

[21] Appl. No.: 625,718

[22] Filed: Jun. 28, 1984

Related U.S. Application Data

[63] Continuation of Ser. No. 466,549, Feb. 15, 1983, abandoned.

[51] Int. Cl.³ .................. C02F 1/46; C25B 11/04
[52] U.S. Cl. ...................... 204/149; 204/293; 204/228; 204/271; 204/273; 204/275
[58] Field of Search .............. 204/149, 152, 293, 228, 204/271, 273, 275, 276

[56] References Cited

U.S. PATENT DOCUMENTS

| Re. 26,329 | 1/1968 | Hougen | 204/149 |
|---|---|---|---|
| 2,036,949 | 4/1936 | Meinzer | 204/1 |
| 2,046,467 | 7/1936 | Krause | 204/24 |
| 2,061,323 | 11/1936 | Meinzer | 204/24 |
| 2,105,835 | 1/1938 | Krause | 99/220 |
| 2,809,929 | 10/1957 | Ostrow et al. | 204/293 |
| 2,882,210 | 4/1959 | Jenks | 204/151 |
| 3,392,102 | 7/1968 | Koch | 204/249 |
| 3,654,119 | 10/1970 | White et al. | 204/293 |
| 3,752,747 | 8/1973 | Treharne et al. | 204/149 |
| 3,769,188 | 10/1973 | McMahon | 204/186 |
| 3,923,632 | 12/1975 | Eibl et al. | 204/301 |
| 3,936,364 | 2/1976 | Middle | 426/66 |
| 4,073,273 | 2/1978 | McMahon | 123/119 E |
| 4,073,712 | 2/1978 | Means et al. | 204/186 |
| 4,089,768 | 5/1978 | Fischer et al. | 204/228 |
| 4,098,660 | 7/1978 | Eibl et al. | 204/151 |
| 4,199,429 | 4/1980 | McMahon | 204/302 |
| 4,199,430 | 4/1980 | McMahon | 204/302 |
| 4,263,114 | 4/1981 | Shindell | 204/149 |
| 4,304,648 | 12/1981 | Vellas | 204/149 |

FOREIGN PATENT DOCUMENTS 1075637 4/1980 Canada .
314667 7/1929 United Kingdom .

Primary Examiner—John F. Niebling
Assistant Examiner—B. J. Beggs, Jr.
Attorney, Agent, or Firm—Steele, Gould & Fried

[57] ABSTRACT

A method and apparatus for purifying water includes a pump and purification cell, the cell having two electrodes, at least one of which electrodes is approximately 92 percent copper, 3 percent silver and 5 percent nickel, by weight. An electrical potential is developed between the electrodes and caused to alternate in polarity to prevent plating. Copper and silver ions are released into the water at adjustable rate, where they cooperatively destroy bacteria, algae, and the like.

27 Claims, 8 Drawing Figures

METHOD AND APPARATUS FOR PURIFICATION OF WATER

This is a continuation of application Ser. No. 466,549, filed Feb. 15, 1983, now abandoned.

BACKGROUND OF THE INVENTION

1. Field of the Invention

This invention relates to the field of water purification, and in particular to an electrical purification apparatus and method which may be employed in place of chlorine water purification.

2. Description of the Prior Art

The use of copper ions as an algicide, and the use of silver ions as a bactericide, are both known in the art. Various procedures are known in which such ions are caused to be distributed in water to be purified where the ions combine with, and eliminate, algae and bacteria, respectively. Although the effect of these ions in reducing concentrations of various organisms is known, the problem remains as to how the ions are most efficiently generated and distributed.

In order to purify water, it is necessary to provide an adequate concentration of the silver or copper ions. One possibility is to employ immersed copper or silver electrodes connected to a source of electric potential. Unfortunately, the result of simply connecting a potential to electrode plates is that the ions migrate to the cathode, and are there deposited. Plating formed in this manner degrades the ability of the apparatus to produce ions because the plating tends to insulate the cathode from the electric current.

Methods and apparatus for purifying water using electrical techniques are shown in U.S. Pat. Nos. 4,263,114-Shindell, 3,752,747-Treharne et al, 4,098,660-Eibl et al and 3,936,364-Middle.

The Shindell patent attempts to avoid any direct electrical connection to the electrodes. Instead, a quantity of silver and a quantity of copper are joined along a junction. The joined body is immersed in the water, which is lightly salted, and an electric field, not directly connected to the electrodes, is placed across the device.

Of the remaining patents cited, Treharne et al teaches use of silver electrodes to produce ions toxic to algae. Eibl et al each such a device also including a semipermeable membrane. The patent to Middle discloses a multi-chamber device including a module having silver electrodes and a module having zinc or steel electrodes.

In connection with preparation of drinking water, and with purifying water for swimming pools, saunas, air conditioning reservoirs, and the like, the most common form of water pruification is treatment with chlorine, and filtering. Chlorine is effective to kill bacteria and algae. However, chlorine is also dangerous in concentration, and potentially irritating or unpleasant in any event. Chlorine has a strong odor, corrodes exposed surfaces, and may aggravate respiratory disorders, skin conditions and eye irritation. Chlorine is also a temporary or repetitive treatment in that the chemical is deactivated by sun, rain, and changes in temperature. Inasmuch as the level of active chlorine varies due to the particular conditions, the swimming pool or other water reservoir must be frequently tested for adequate chlorine levels. Although effective to eliminate algae and bacteria, chlorine has substantial adverse qualities as well.

The present system employs electrodes formed from a particular alloy of copper, silver and nickel. The electrodes are immersed in a cell through which water is pumped. By applying an electric field at a relatively low voltage, copper and silver ions are simultaneously released from the electrodes into the water flowing through the purification cell. Simultaneous release of ions produces a cooperative effect in which relatively low ion concentrations achieve the desired result. Plating of the cathode is avoided by periodically reversing the polarity of the voltage applied to the two identical electrodes. Accordingly, copper and silver ions in sufficient concentrations to be toxic to algae and bacteria are released indefinitely into the water without the requirement of regular additional service. A filter is recommended in addition to the invention, in order to remove particulate matter and the like. Nevertheless, the electronically controlled release of ions from the electrodes produces water pure enough for human consumption without the inconvenience, objectionable odor, taste and chemical effects of chlorine or other oxidizing agents.

SUMMARY OF THE INVENTION

It is an object of the present invention to efficiently and conveniently purify water without the requirement of chlorine.

It is also an object of the invention to provide an effective water purification apparatus requiring a minimum of maintenance.

It is another object of the invention to simultaneously emit silver ions as an algicide and copper ions as a bactericide in the same water treatment apparatus, and to thereby secure the cooperative water purification effect of both ion treatments on one another.

It is yet another object of the invention to provide an inexpensive and effective water treatment apparatus which may be conveniently connected to conventional reservoirs such as swimming pools, spas, air conditioning coolant reservoirs and the like.

These and other objects are accomplished by a method and apparatus for purifying water, comprising a purification cell, means for circulating water through the cell, over electrodes disposed in the cell, at least one of the electrodes comprising an alloy of 85 percent to 93 percent copper, by weight, 1.5 percent to five percent silver, by weight, and 2.5 percent to 7 percent nickel, by weight. Means are further provided for developing an electrical potential between the electrodes, whereby copper ions and silver ions are released into the water in the purification cell.

The cooperative use of copper and silver make these ions effective at concentration levels substantially less than that otherwise necessary when copper and silver are released independently. In using identical electrodes of the aforesaid alloy, the polarity may be periodically reversed, in order to prevent the plating of the cathode and premature degradation of operation of the electrode.

BRIEF DESCRIPTION OF THE DRAWINGS

There are shown in the drawings the embodiments which are presently preferred. It should be understood, however, that the invention is not limited to the precise arrangements and instrumentalities shown.

DETAILED DESCRIPTION OF THE PREFERRED EMBODIMENTS

The purification cell of the invention is useful for water purification purposes generally. Water purification is commonly considered with reference to swimming pools. It will be appreciated that water purification systems of similar needs and complexity are required not only in swimming pools, but in systems for preparing potable water, air conditioning water reservoirs, spas, baths, whirlpools, jacuzzzies, and the like.

Water purification installations may or may not comprise a filter for extraction of solid material from the water. The purification method and apparatus of the invention is applicable to systems with or without filters and of each of the foregoing descriptions, and at the simplest requires only a means of circulating water from the reservoir of water to be purified, over the electrodes and back to the reservoir. The invention will be described primarily with reference to swimming pools, but it will be appreciated that many of the same considerations apply to each type of water reservoir.

Figure 1:
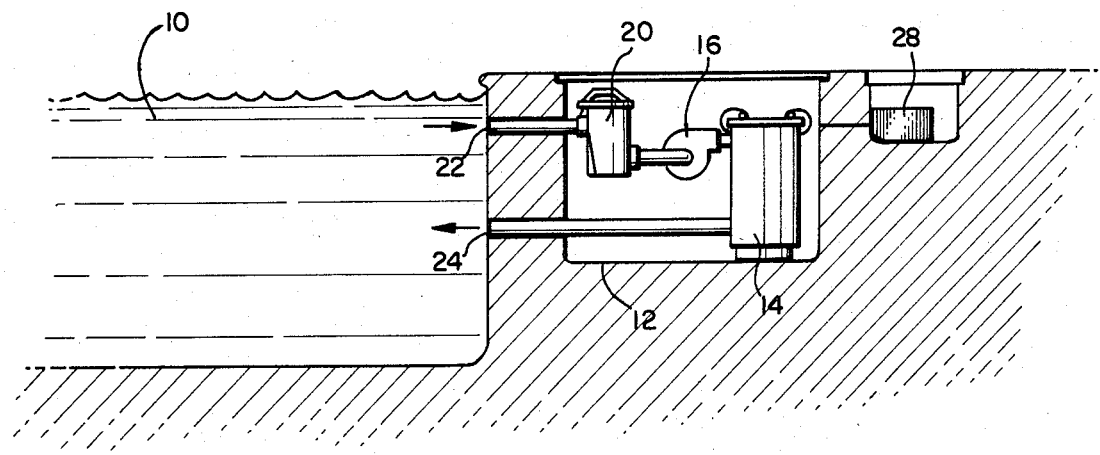
FIG. 1 is a section view showing the connection of the purification cell of the invention in a conventional swimming pool pump/filter arrangement.

As shown in FIG. 1, the usual swimming pool water treatment includes a pump 16 which draws water from reservoir 10 (i.e., the pool) through input conduit 22. The pump forces the water through filter 14, to be retruned by a conduit 24. In addition to this usual system, the present invention contemplates use of purification cell 20, which releases silver and copper ions into the circulating water, to remove bacteria and algae throughout the system. The controlling circuit 28 for purification cell 20 can be conveniently located in the compartment 12 housing the filter and pump, or the controller can be housed, as shown in FIG. 1, in a watertight neighboring compartment.

The purification cell may be located either upstrream or downstream of the filter and/or pump. Upstream of the pump is preferred to minimize water pressure. The released ions go into solution in the water, and will not tend to foul the filter. Instead, over a period of time, a concentration of free ions builds up in reservoir 10, where the ions preclude the development of objectionable levels of algae, bacteria or fungi.

Figure 2:
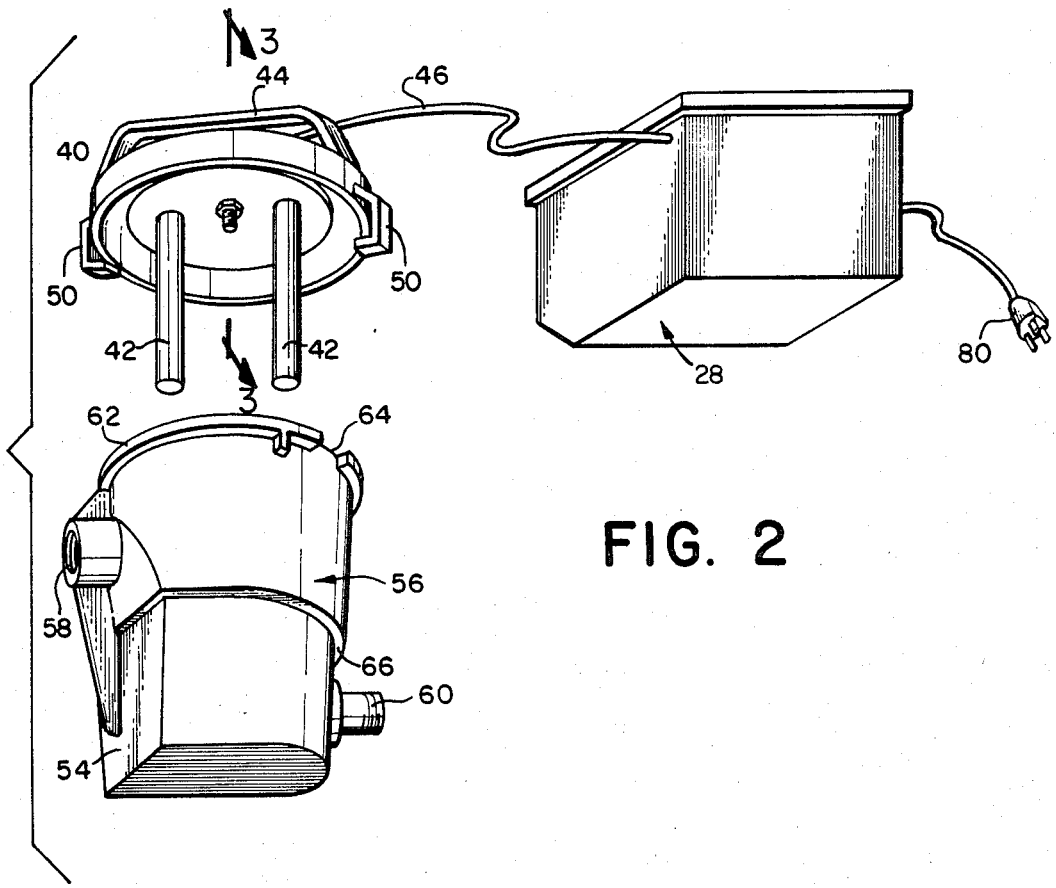
FIG. 2 is an exploded perspective view of the purification cell of the invention.

The mechanical structure of cell 20 is illustrated in FIG. 2. A container 56, having an input 58 and and output 60, suitably threaded for connection to standard system conduits, carries water from reservoir 10 to filter pump 16. Upon passing through container 56, the water receives ions released from electrodes 42, which electrodes may be carried by removable lid 40 of the purification cell. The release of ions from electrodes 42 is powered by control module 28, in turn connected to a source 80 of AC power.

Container 56 is shaped to tightly receive lid 40, carrying electrodes 42. An interfitting clip and rim structure is preferred such that lid 40 may be placed on container 56, twisted, and thereby tightly locked to the body of the container. This connection is accomplished by the rim 62 on the open top of container 56. Rim 62 includes a gap 64, dimensioned to receive the attachment clips 50 on lid 40. The generally flange-shaped clips 50 engage along the lower edge of rim 62 as the lid 40 is twisted upon container 56. A suitable gasket or O-ring may be placed between lid 40 and rim 62 of container 56, to further seal and secure the fit thereof. Handle 44 is provided on top of lid 40, in order to facilitate manual removal and installation of lid 40 on container 56.

The electric control apparatus 28 is operative to place a potential difference (i.e. voltage) across the electrodes 42, 42, which are preferably identical. This potential difference is reversed in polarity periodically, to avoid (and reverse) plating on the cathode which occurs as positive ions migrate to the negatively-charged cathode. The quantity of ions released by the anode will depend upon the voltage applied to the electrodes, and upon various other factors including the extent to which the electrodes have become fouled. For the moment, it will suffice to say that approximately 20-30 volts are applied to the electrodes, and approximately 500 milliamps of current is passed between the electrodes.

The two electrodes preferably have an identical composition. The electrodes are an alloy of copper, silver and nickel in which the copper (Cu) comprises 85-93%, by weight, of the total weight of the composition. The silver (Ag) comprises 1.5-5%, by weight, and the nickel (Ni) comprises 2.5-7%, by weight. Within these ranges, a preferred alloy comprises 90-92% copper, 2-4% silver and 4-6% nickel, by weight. The especially preferred and present commercial embodiment of the electrode alloy is about 92% copper, about 3% silver and about 5% nickel, by weight.

The electrodes 42 are suspended within the space defined by container 56, as water is circulated through container 56 by action of filter pump 16. The released copper and silver ions, which may be expressed as $Cu++$ and $Ag++$, merely separate from the electrodes and are passed into solution.

In solution, the ions combine with various organisms or with negative ions which may be present. The water entering throught input 58 is directed over electrodes 42, and as the water flows toward output 60, disposed at a lower level, it swirls around the surfaces of the electrodes, picking up released ions. Container 56 is not entirely cylindrical, but preferably has a flat side 54, and a discontinuity or baffle 66, to further agitate the water flowing through container 56.

Under the aforesaid conditions, a sufficient number of copper and silver ions are released into the water to normally produce potable water, that is, water acceptable under applicable standards for drinking water. Standards for potable water include maximum levels of algae and bacteria and also maximum concentrations of ions. Purification is accomplished in the present invention by the cooperative use of the copper and silver ions, at safe concentrations far below those which would be required in order to achieve a similar effect using copper and silver which were dispersed separately in a bactericidic or algicidic system, respectively.

The system of the invention is operated so as to provide $Cu++$ ions at a level in the range of approximately 350 to 500 part per billion of water (ppb) and $Ag++$ ions at a level in the range of approximately 25–45 ppb. In other words, the water being purified must be given a combination of 350–500 ppb $Cu++$ and 25–45 $Ag++$ in order to reach potable water quality. If one were to attempt to use only $Cu++$ to produce acceptable bacteria-free pool water it would be necessary to have 2,500 ppb $Cu++$ in the water. However, if $Cu++$ were present at 2,500 ppb in pool water there would be staining of the walls of the pool and the level of $Cu++$ ions in the water would be too high for safe human consumption. One thousand (1,000) ppb $Cu++$ is the maxiumum allowable level of copper in drinking water.

It is impossible to reach an effective concentration of $Ag++$ alone which would be satisfactory for drinking quality ("potable") pool water. This is because it would require at least 400 to 500 ppb $Ag++$ to achieve appropriate quality drinking water. At such a level of concentration, however, the $Ag++$ would combine with other elements in the pool and silver chloride (inter alia) would precipitate out and collect on the bottom of the pool.

In view of the concentrations of ions used, it is surprising and unexpected to find that it is possible to produce potable, drinking quality water in a pool having $Cu++$ ions in the modest range of 350 to 500 ppb and $Ag++$ ions in the likewise modest range of 25–45 ppb, the only qualification being that both ions must be present in the pool water simultaneously at the stated levels. Pool water containing these levels of $Cu++$ and $Ag++$ will have an algae count of less than 20 organisms per milliliter and a bacterial plate count of less than 150 organisms per milliliter. The water therefore meets the standard of "crystalline, blue water," which is the usual standard used in the pool industry today. The purity is also acceptable in other applications such as spas, baths and collant reservoirs.

The level of $Cu++$ and $Ag++$ in a substantially maintenance-free system as specified above is made possible as a result of the constant change in polarity of the voltage applied to the electrodes. This change of polarity is accomplished every 5–20 seconds or preferably in the range of 10–17 seconds. In other words, at a 50% duty cycle, the electrodes are driven by a square wave of up to approximately 20–30 volts (centered at zero volts), having a period of 10–40 seconds per cycle, and preferably a period of 20–37 seconds per cycle.

Figure 4:
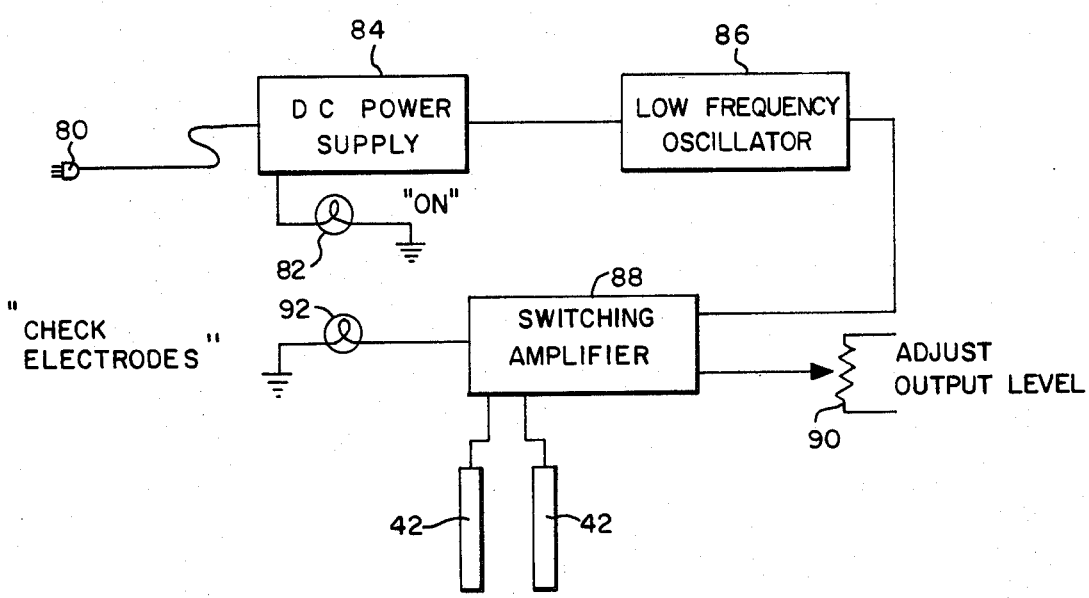
FIG. 4 is a block diagram of the source of the electrical potential for the electrodes.

The reversal of polarity is accomplished using conventional electronic circuitry as shown, for example, in a schematic block diagram in FIG. 4. A source of AC power 80 drives the system, comprising for example, a simple DC power supply, a low frequency oscillator and appropriate switching circuits. The DC power supply 84 may comprise a center-tapped transformer, bridge rectifier and capacitor, as known in the art. Inasmuch as the power is used in proximity with water, and in particular water containing ions, care should be taken to minimize the possibility of electric shock. Suitable insulation and grounding should be employed, and an indicator light 82 used to inform persons that the system is activated.

Low frequency oscillator 86 operates to time the period between changes in polarity. The period of 10–40 seconds per cycle, or preferably 20–37 seconds per cycle, means that the anode and cathode will be reversed after 5 to 20 seconds (preferable 10–17 seconds). Integrated circuit timers or other such devices may be conveniently used.

The output stage may employ a switching amplifier 88, or other appropriate driving circuits such as SCR switching circuits or the like. In using a switching amplifier 88, or another element operable to regulate voltage the user can adjust the gain of the system to thereby adjust the output voltage of the purifier as present on the electrodes. The output voltage on the electrodes, other things being equal, will control the rate of ion emission.

In order to detect fouling of the electrodes, for example due to dirt and/or plating, the current output of the system (i.e., the rate of ion emission) may be sensed and compared to an arbitrary standard. When the current at a given voltage falls below a reference amount, indicator lamp 92 is activated, advising the user to check and/or clean the electrodes.

The particular circuits employed are conventional and subject to design choices of various types. It is presently preferred that a low cost circuit be used in which integrated circuit packages having multiple amplifiers may be used for the amplifying and comparing functions.

Figure 8:
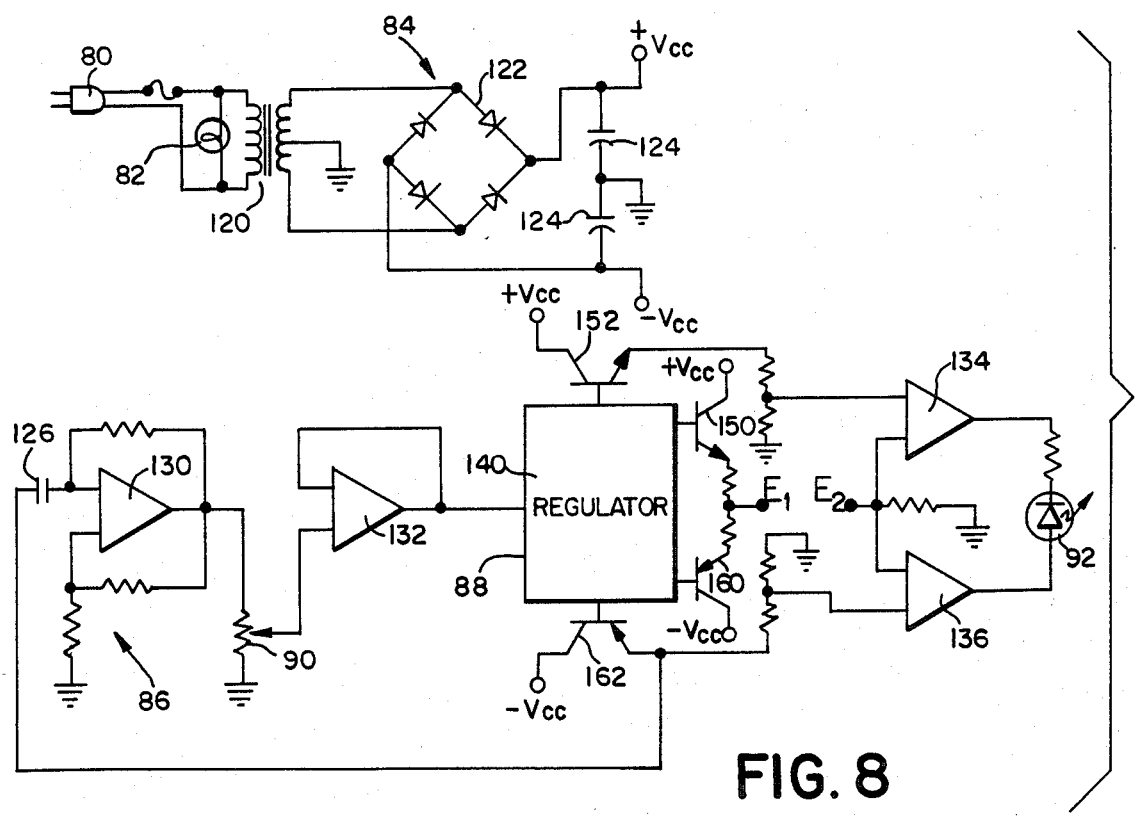

As shown schematically in FIG. 8, one possible driving circuit requires relatively few basic parts. Power supply 84 comprises center-tapped transformer 120, bridge rectifier 122 and filter capacitors 124. The output of the supply 84 drives a series of operational amplifiers and a voltage regulator. Amplifier 130 is used as a feedback amplifier changing state in response to the charging of capacitor 126. Potentiometer 90 sets the voltage level applied to follower amplifier 132 which, in turn, drives the voltage regulator 140, for example, Intersil Company IC package 8231 or the like. Based upon the input to the voltage regulator, the output, fed through series regulating transistors 150, 152, 160, 162, is positive or negative with respect to ground. One of the electrodes, $E_1$, is driven (through current limiting resistors) by the output, and the other electrode, $E_2$, is connected (also through a resistor) to ground. Amplifiers 134, 136 are run as comparators, to compare the voltage at $E_2$ to a reference voltage defined by voltage dividers, and to activate warning light 92 when the voltage falls below the reference, thereby indicating an output current below standard.

Figure 3:
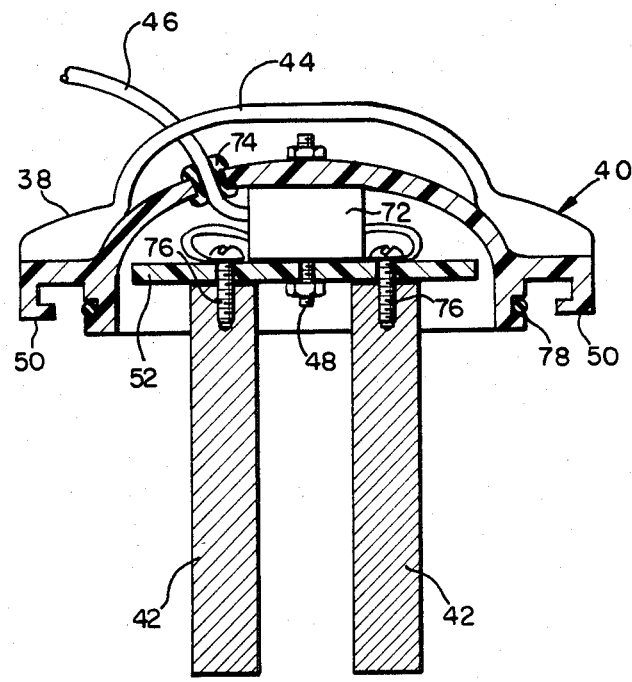
FIG. 3 is a section view of the electrode assembly, taking along lines 3—3 in FIG. 2.

FIG. 2 shows the particular contour preferred for container 56, which is preferably of molded plastic. The mechanical particulars regarding the mounting of electrodes 42 are shown in FIG. 3. It will be appreciated that the cover 40 of the purification cell need only position the electrodes in the cavity defined by container 56, and to seal the container against leakage. As shown in FIG. 3, a two-part lid is preferred. The external cap 38 of lid 40 includes integrally molded rim engaging means 50, handle 44, and reinforcing webbing. The electrodes 42 are mounted to lid 40 by means of insulating plate 52 and spacer terminal block 72. A central bolt 48 compresses insulating plate 52 and cap 38 around terminal block 72. Terminal block 72 spaces the elements and provides a connection point for electric wire 46, carrying the output of electronic control box 28. Grommet 74 or other suitable sealing means complete a water tight lid for closing container 56. Suitable O-rings 78 may also be employed to improve the seal.

A number of alternative electrode and container arrangements may be employed without departing from the spirit of the invention. The basic embodiment is shown schematically in FIG. 5. A pair of identical electrodes 42, 42 are suspended in a cavity defined by container 56. Container 56 has an input 58 and output 60 at differing vertical levels, causing the current of water to swirl through container 56 from input to output. The swirling is accented by discontinuities, for example baffles 68, corresponding to the stepped edge 66, shown in FIG. 2. The identical electrodes 42, 42, are maintained at differing DC voltages, the polarity of which is periodically reversed.

Figure 5:
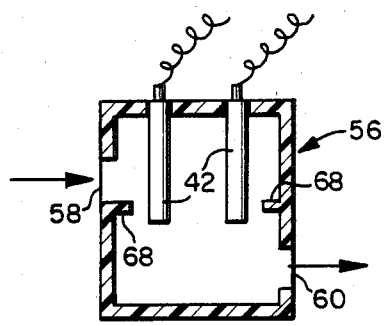
FIG. 5 is a schematic section view of a purification cell according to the invention.
Figure 6:
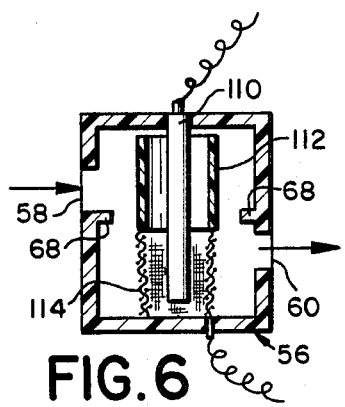
FIG. 6 is a schematic section view of an alternative embodiment of the cell wherein one of the electrodes is a screen member.

With reference to FIG. 6, a single massive electrode of the type shown in FIG. 5 may be used together with a cathode in the form of a metallic screen. The single electrode 110 is, in fact, the anode and the screen 114 is the cathode in a system analagous to that of FIG. 5. Unlike FIG. 5, the polarity of the embodiment of FIG. 6 does not change, whereby calcium carbonate ($CaCO_3$) and other positive ions are collected out of the system and accumulates on the cathode.

The embodiment of FIG. 6 preferably also includes an additional flow controlling member 112, in the general shape of a tube surrounding all but the uppermost part of electrode 110, immmediately above screen 114. Accordingly, water entering through input 58 is directed upward due to the influence of baffles 68. The water thus passes over the top of tubular shield 112, and over the length of electrode 110, passing outwards through screen 114, leaving container 56 though output 60.

Figure 7:
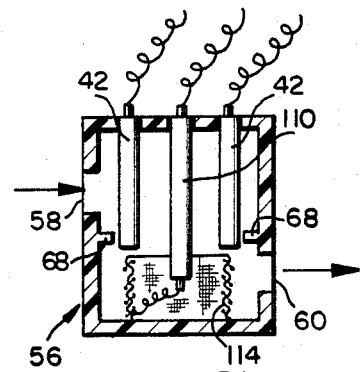
FIG. 7 is a schematic section view of an alternative embodiment of the purification cell, having an additional electrode for further treatment of the water; and, FIG. 8 is a schematic diagram of a particular driving circuit according to the invention.

A composite system is illustrated in FIG. 7, wherein paired electrodes 42 are mounted together with a central electrode 110. Central electrode 110 is electrically connected to the screen 114, through which treated water passes to reach output 60.

Each of the embodiments of FIGS. 5, 6 and 7 includes an insulated container 56, in order to avoid shorting between the electrodes. The cylindrical electrodes in each of the embodiments, namely electrodes 42 and 110, are composed of the copper/silver/nickel alloy described hereinabove. The embodiment of FIG. 6 may employ a carbon central electrode, however, it will be appreciated that at least one alloy electrode is need to produce the emission of bactericidal and algicidal ions.

The screen portions of the electrodes, as shown in FIGS. 6 and 7 are suitably made of stainless steel mesh. Each of the screens will accumulate calcium carbonate and other positive ions, and must be periodically replaced.

The invention may be described as a method of water purification wherein the aforesaid apparatus is used in the manner described, namely, comprising the steps of circulating water over electrodes comprising the alloy of the invention, thereby releasing copper ions and silver ions into the circulating water at bactericidal and algicidal concentrations. The method further comprises the steps developing an electrical potential between the electrodes, and preferably periodically reversing the polarity of said potential.

The method of the inventon comprises purification of water by simultaneously releasing copper ions in the range of approximately 350 to 500 parts per billion and silver ions in the range of approximately 25–45 parts per billion into the water to be purified. Ion releasing is preferably accomplished directly from the body of solid electrodes, preferably of the aforesaid alloy.

The apparatus of the invention is effective to purify water for various uses. In connection with a swimming pool, use of the invention precludes the necessity of noxious chlorine, and also reduces the requirement of running the filter pump for long periods of time. Four simple steps are required to effectively maintain a water purification system for a swimming pool in accordance herewith.

The water purification system will function in the pH range of 6.5 to 8.5. The pH should preferably be kept between 7.4 and 7.6. The pH may be adjusted as known in the art by use of muriatic acid, to lower the pH, or soda ash (sodium carbonate) to raise the pH. A standard swimming pool tester may be used to test the pH. The user should wait approximately 45–60 minutes after the addition of acid or soda ash, while running the pool filter pump, before testing the pH again.

Inasmuch as the pH and alkalinity of the pool are related, the alkalinity should be maintained in the range of 80–150 mg/l range, thus making pH adjustment much easier. Over time the alkalinity generally drops, but may be increased by addition of sodium bicarbonate.

When initially activating the water purification system according to the invention, it is helpful to operate the ion emission at the maximum level, to initially kill bacteria and algae present. A control potentiometer 90, shown in FIG. 4, is provided in order to allow the initial increase in ion output, for example for a day or two, whereupon the voltage level (and therefore the ion emission rate) can be reduced to mid-range. Of course, the rate of ion emission can be adjusted at any time by means of voltage adjustment 90, based upon the results of regular water purity tests.

Inasmuch as the water purification cell depends upon water circulated by the filter pump, ions need only be emitted while the pump is running. The water purification cell and the filter pump may therefore be run from a common power source. During periods of light pool use (e.g., during cool weather) an eight hour daily pump cycle will probably suffice. During warm weather months of heavier pool use, a twelve hour pump cycle should be employed.

The present water purification system is highly efficient in killing bacteria and algae. It does not, however, physically remove grease, oil, or organic debris such as hair, dead insects and leaves. Such materials may be removed by periodically shocking the pool using chlorine or other oxidizing agents. Shock treatments are, of course, known in the art. Unlike the art, the user of the present invention need not employ chlorine regularly, but may rely upon the water purification cell, shocking the pool only two or three times per year.

The invention is capable of a number of variations within the teachings hereof. Such variations will now be apparent, in light of this disclosure. Reference should be made to the appended claims rather than the foregoing specification as indicating the true scope of the subject invention.

What is claimed is:

1. A method for purifying a body of water, comprising the steps of:
   circulating the water over two electrodes, the electrodes being solid bars, the water being circulated in a discontinuous path defined by an enclosure for the electrodes, at least one of the electrodes being wired to ground potential through a resistor, at least one of the electrodes comprising an alloy of:
   approximately 85% to 93% copper, by weight;
   approximately 1.5% to 5% silver, by weight;

approximately 2.5% to 7% nickel, by weight;

simultaneously releasing copper ions and silver ions into the circulating water at concentration levels which are effective to substantially reduce algae and bacteria levels, but which are substantially less than the levels otherwise necessary to be so effective when released independently, by developing an electrical potential between the electrodes, whereby the water may be purified without need for chlorine treatment; and, sensing and indicating fouling of the electrodes by monitoring the potential of the electrode wired through the resistor, fouling being detected by a drop in said potential.

2. The method of claim 1, comprising the step of releasing the copper ions at a level in the range at approximately 350 to 500 parts per billion and releasing the silver ions at a level in the range of approximately 25 to 45 parts per billion.

3. The method of claim 1, wherein both of the electrodes are formed from the alloy.

4. The method of claim 3, further comprising the steps of applying the electrical potential from a direct current source and periodically reversing the polarity of the source.

5. The method of claim 4, comprising the step of reversing the polarity at a duty cycle of approximately 50% and a period in the range of approximately 10 to 40 seconds per cycle.

6. The method of claim 5, wherein the water is circulated over at least one electrode comprising an alloy of approximately 90 to 92% copper, by weight; approximately 2-4% silver, by weight; and, approximately 4-6% nickel, by weight.

7. The method of claim 6, wherein the water is circulated over at least one electrode having a composition of about 92% copper, about 3% silver, and about 5% nickel.

8. The method of claim 5, comprising the steps of reversing the polarity at a period in the range of approximately 20-34 seconds per cycle.

9. The method of claim 1, wherein the water is circulated over at least one electrode comprising an alloy of approximately 90 to 92% copper, by weight; approximately 2-4% silver, by weight; and, approximately 4-6% nickel, by weight.

10. The method of claim 9, wherein the water is circulated over at least one electrode having a composition of about 92% copper, about 3% silver, and about 5% nickel.

11. An apparatus for purifying a body of water, comprising:

a purification cell defining a water flow path and having at least one discontinuous surface for disturbing the path;

means for circulating the water through the cell;

two electrodes disposed in the cell and thereby immersible in the circulating water, at least one of the electrodes comprising an alloy of:

approximately 85% to 93% copper, by weight;

approximately 1.5% to 5% silver, by weight; and, approximately 2.5% to 7% nickel, by weight;

means for detecting electrode fouling; and, means for developing an electrical potential between the electrodes, under the influence of which copper ions and silver ions are simultaneously released into the water at concentration levels which are effective to substantially reduce algae and bacteria levels in the water, but which are less than the levels otherwise necessary to be so effective when released independently, whereby, the body of water may be purified without need for chlorine treatment.

12. The apparatus of claim 11, wherein the means for developing the electrical potential induces the release of the copper ions at a level in the range of approximately 350 to 500 parts per billion and the release of the silver ions at a level in the range of approximately 25 to 45 parts per billion.

13. The apparatus of claim 11, wherein both of the electrodes comprise the alloy.

14. The apparatus of claim 13, wherein the means for developing the electrical potential includes a direct current source connected to the electrodes and means for periodically reversing the polarity of the direct current source.

15. The apparatus of claim 14, wherein the means for reversing polarity operates at a duty cycle of approximately 50% and at a period in the range of approximately 10 to 40 seconds per cycle.

16. The apparatus of claim 15, wherein said electrodes comprise an alloy of:

approximately 90 to 92% copper, by weight;

approximately 2-4% silver, by weight; and, approximately 4-6% nickel, by weight.

17. The apparatus of claim 16, wherein said electrodes comprise an alloy of about 92% copper, about 3% silver and about 5% nickel, by weight.

18. The apparatus of claim 15, wherein the means for reversing polarity has a period in the range of approximately 20-34 seconds per cycle.

19. The apparatus of claim 11, wherein said electrodes comprise an alloy of:

approximately 90 to 92% copper, by weight;

approximately 2-4% silver, by weight; and, approximately 4-6% nickel, by weight.

20. The apparatus of claim 19, wherein said electrodes comprise an alloy of about 92% copper, about 3% silver and about 5% nickel, by weight.

21. The apparatus of claim 11, wherein the purification cell comprises a substantially cylindrical container having a cylindrical portion, a flattened portion, and a stepwise connection between the cylindrical and flattened portions, thereby causing water to swirl through a baffle formed by the stepwise connection.

22. The apparatus of claim 11, wherein the discontinuous surface includes a stepwise decrease in diameter of the purification cell.

23. The apparatus of claim 22, wherein the container comprises a removable sealing end cap, the electrode being end-wise attached to the cap and removable together with the cap, whereby the electrode is conveniently accessible for cleaning.

24. The apparatus of claim 11, wherein at least one of the electrodes is a solid bar of said alloy, the bar being removably disposed parallel to the axis of said cylindrical container and extending longitudinally into the cylindrical container, at least to a level defined by the discontinuous surface.

25. The apparatus of claim 24, wherein the solid bar electrode disposed in the cell wired as an anode and the other electrode is at least one of a screen wired as cathode.

26. The apparatus of claim 11, wherein the means for detecting and indicating electrode fouling comprises a comparator wired to compare the voltage at one of the electrodes to a predetermined reference voltage defined by a voltage divider, the comparator activating a warning lamp when the voltage at the electrode falls below the reference voltage thereby indicating an output current below a predetermined standard.

27. The apparatus of claim 11, further comprising means for adjusting the output voltage at the electrode including a control potentiometer.

* * * * *